(12) United States Patent
Pai et al.

(10) Patent No.: US 12,038,793 B2
(45) Date of Patent: Jul. 16, 2024

(54) ELECTRONIC DEVICE AND HINGE MECHANISM THEREOF

(71) Applicant: Acer Incorporated, New Taipei (TW)

(72) Inventors: Ting-Wen Pai, New Taipei (TW); Yu-Shih Wang, New Taipei (TW); Yi-Ta Huang, New Taipei (TW); Chih-Chun Liu, New Taipei (TW); Cheng-Nan Ling, New Taipei (TW); Wen-Chieh Tai, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 133 days.

(21) Appl. No.: 17/832,408

(22) Filed: Jun. 3, 2022

(65) Prior Publication Data
US 2023/0129418 A1    Apr. 27, 2023

(30) Foreign Application Priority Data
Oct. 21, 2021 (TW) ................................. 110212384

(51) Int. Cl.
*G06F 1/16* (2006.01)
*F16C 11/04* (2006.01)

(52) U.S. Cl.
CPC ............ *G06F 1/1681* (2013.01); *F16C 11/04* (2013.01); *G06F 1/1637* (2013.01)

(58) Field of Classification Search
CPC .... G06F 1/1681; G06F 1/1637; G06F 1/1616; F16C 11/04; E05Y 2900/606
See application file for complete search history.

(56) References Cited

U.S. PATENT DOCUMENTS

| | | | | |
|---|---|---|---|---|
| 4,632,471 A | * | 12/1986 | Visnapuu | G06F 1/1611 248/442.2 |
| 7,107,648 B1 | * | 9/2006 | Lu | H04M 1/0216 16/330 |
| 8,091,178 B2 | * | 1/2012 | Degner | G06F 1/1683 16/373 |
| 8,209,817 B2 | * | 7/2012 | Shen | G06F 1/1681 16/337 |
| 8,310,819 B2 | * | 11/2012 | Shen | G06F 1/1616 361/679.01 |
| 8,908,362 B2 | * | 12/2014 | Wang | G06F 3/0221 200/341 |
| 9,624,704 B1 | * | 4/2017 | Hsu | E05D 11/087 |
| 10,174,535 B2 | * | 1/2019 | Lin | G06F 1/1681 |
| 10,558,245 B2 | * | 2/2020 | Morrison | G06F 1/1637 |
| 10,831,244 B1 | * | 11/2020 | DeMaio | G06F 1/1626 |
| 10,845,850 B1 | * | 11/2020 | Kang | E05D 3/122 |
| 10,931,070 B1 | * | 2/2021 | Files | H01R 24/40 |

(Continued)

*Primary Examiner* — Anthony M Haughton
*Assistant Examiner* — Theron S Milliser
(74) *Attorney, Agent, or Firm* — McClure, Qualey & Rodack, LLP

(57) ABSTRACT

A hinge mechanism is provided, including a connecting unit, a hinge unit, and a locking element. The connecting unit has a connecting member and a tubular member. The tubular member is disposed on the connecting member. The hinge unit has a first member, a second member, a shaft, and a rod. The shaft pivotally connects the first member to the second member. The rod is affixed to the second member. The rod extends into the tubular member and has a slot. The locking element is fastened through the tubular member and joined in the slot.

9 Claims, 20 Drawing Sheets

(56) References Cited

U.S. PATENT DOCUMENTS

| | | | |
|---|---|---|---|
| 11,231,754 B2* | 1/2022 | Kang | H04M 1/022 |
| 11,237,600 B2* | 2/2022 | DeMaio | G06F 1/1656 |
| 11,291,440 B2* | 4/2022 | Harris | A61B 18/1442 |
| 11,447,992 B2* | 9/2022 | Wang | G06F 1/1681 |
| 11,662,781 B2* | 5/2023 | Kang | G06F 1/1616 |
| | | | 361/679.01 |
| 2006/0207061 A1* | 9/2006 | Lu | H04M 1/0216 |
| | | | 16/330 |
| 2007/0136992 A1* | 6/2007 | Lu | E05D 11/1078 |
| | | | 16/330 |
| 2009/0260187 A1* | 10/2009 | Wang | G06F 1/1681 |
| | | | 16/307 |
| 2011/0016669 A1* | 1/2011 | Shen | G06F 1/1681 |
| | | | 16/342 |
| 2011/0273821 A1* | 11/2011 | Shen | H04M 1/0216 |
| | | | 361/679.01 |
| 2014/0055936 A1* | 2/2014 | Wang | G06F 3/0221 |
| | | | 361/679.15 |
| 2018/0230724 A1* | 8/2018 | Lin | G06F 1/1616 |
| 2019/0243426 A1* | 8/2019 | Morrison | G06F 1/1618 |
| 2020/0054320 A1* | 2/2020 | Harris | A61B 17/29 |
| 2020/0348732 A1* | 11/2020 | Kang | G06F 1/1652 |
| 2021/0041921 A1* | 2/2021 | Kang | G06F 1/1652 |
| 2021/0081008 A1* | 3/2021 | DeMaio | G06F 1/1656 |
| 2022/0113770 A1* | 4/2022 | Kang | H04M 1/0268 |
| 2022/0175375 A1* | 6/2022 | Harris | A61B 18/1442 |
| 2022/0228409 A1* | 7/2022 | Wang | E05D 3/14 |
| 2023/0251692 A1* | 8/2023 | Kang | G06F 1/1681 |
| | | | 361/679.01 |
| 2023/0254390 A1* | 8/2023 | Kim | H04M 1/0214 |
| | | | 455/566 |
| 2023/0296129 A1* | 9/2023 | Kim | G06F 1/1681 |
| | | | 361/807 |

* cited by examiner

ELECTRONIC DEVICE AND HINGE MECHANISM THEREOF

CROSS REFERENCE TO RELATED APPLICATIONS

This application claims priority of Taiwan Patent Application No. 110212384, filed on Oct. 21, 2021, the entirety of which is incorporated by reference herein.

BACKGROUND OF THE INVENTION

Field of the Invention

The present invention relates to an electronic device, and, in particular, to an electronic device that has a hinge mechanism.

Description of the Related Art

FIG. 1 is a schematic diagram showing a housing C and a hinge member F of the display module of a laptop computer placed on a workbench T. FIG. 2 is a schematic diagram showing a display panel D of the display module when assembled to the housing C.

As shown in FIGS. 1 and 2, a conventional display module of a laptop computer usually has a housing C and a U-shaped hinge member F affixed to the housing C. The hinge member F usually has a shaft H that is pivotally connected to the main body of the laptop computer (not shown). When using the laptop computer, the display module can be unfolded with respect to the main body so that the user can watch the screen on the display module. Additionally, the user can control the cursor on the screen with a mouse or input instructions via a keyboard or touchpad on the main body of the laptop computer.

During assembly of the display panel D to the housing C (FIG. 2), the display panel D has to be tilted relative to the housing C first and then inserted into the housing C, as indicated by the arrow in FIG. 2, due to the U-shaped structure of the hinge member F, whereby a part of the display panel D can be received in a recess R of the hinge member F. In this configuration, the assembly process can be difficult and inefficient, and the production cost may increase.

BRIEF SUMMARY OF THE INVENTION

An embodiment of the present invention provides a hinge mechanism that includes a connecting unit, a hinge unit, and a locking element. The connecting unit has a connecting member and a tubular member disposed on the connecting member. The hinge unit has a first member, a second member, a shaft, and a rod. The shaft pivotally connects the first member to the second member. The rod is affixed to the second member. The rod extends into the tubular member and has a slot. The locking element is fastened through the tubular member and joined in the slot.

In some embodiments, the locking element has a C-shaped structure.

In some embodiments, the locking element forms a protrusion extending through the tubular member and joined in the slot.

In some embodiments, the protrusion extends toward the interior of the locking element.

In some embodiments, the locking element has a hole located close to an end of the locking element, and the protrusion extends through the hole and is joined in the slot.

In some embodiments, the locking element forms a plurality of protrusions, and the rod has a plurality of slots, wherein the protrusions extend through the tubular member and are joined in the slots.

In some embodiments, the protrusions are located on opposite sides of the locking element.

In some embodiments, a first flat surface is formed on the inner side of the tubular member, and a second flat surface is formed on the outer side of the rod, wherein the second flat surface abuts the first flat surface when the rod is received in the tubular member.

In addition, an embodiment of the present invention provides an electronic device that includes a main body, a display module, and the hinge mechanism as mentioned above. The first member is affixed to the main body, and the connecting member is affixed to the display module.

In some embodiments, the display module has a housing, a display panel disposed in the housing, and a cover connected to the housing for covering the display panel, and the connecting member is affixed to the housing.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the electronic device and hinge mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
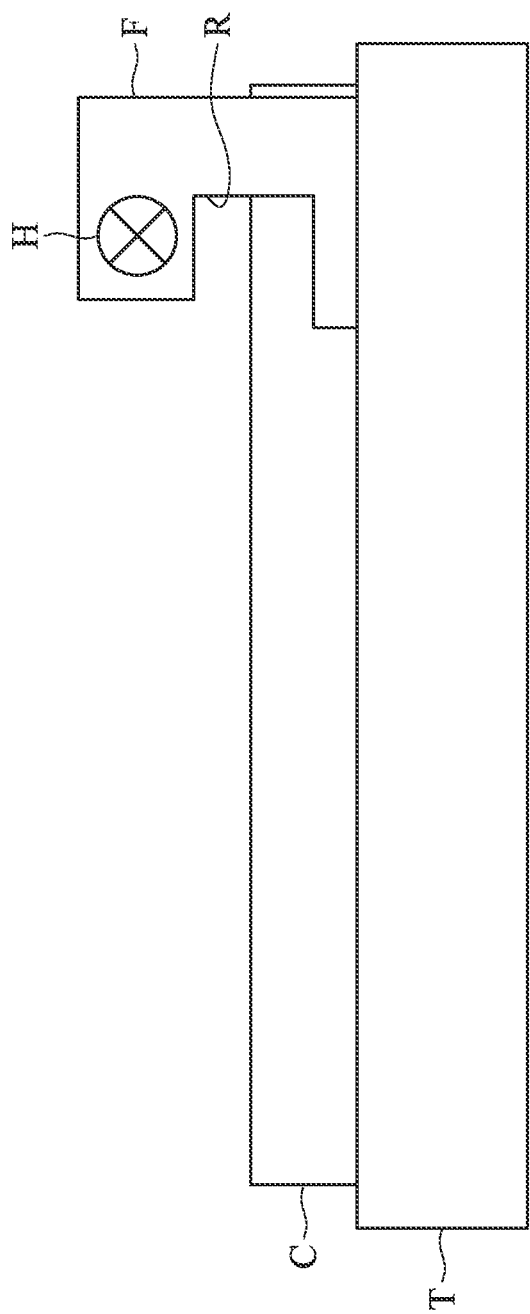
FIG. 1 is a schematic diagram showing a housing C and a hinge member F of a display module of a laptop computer placed on a workbench T.
Figure 2:
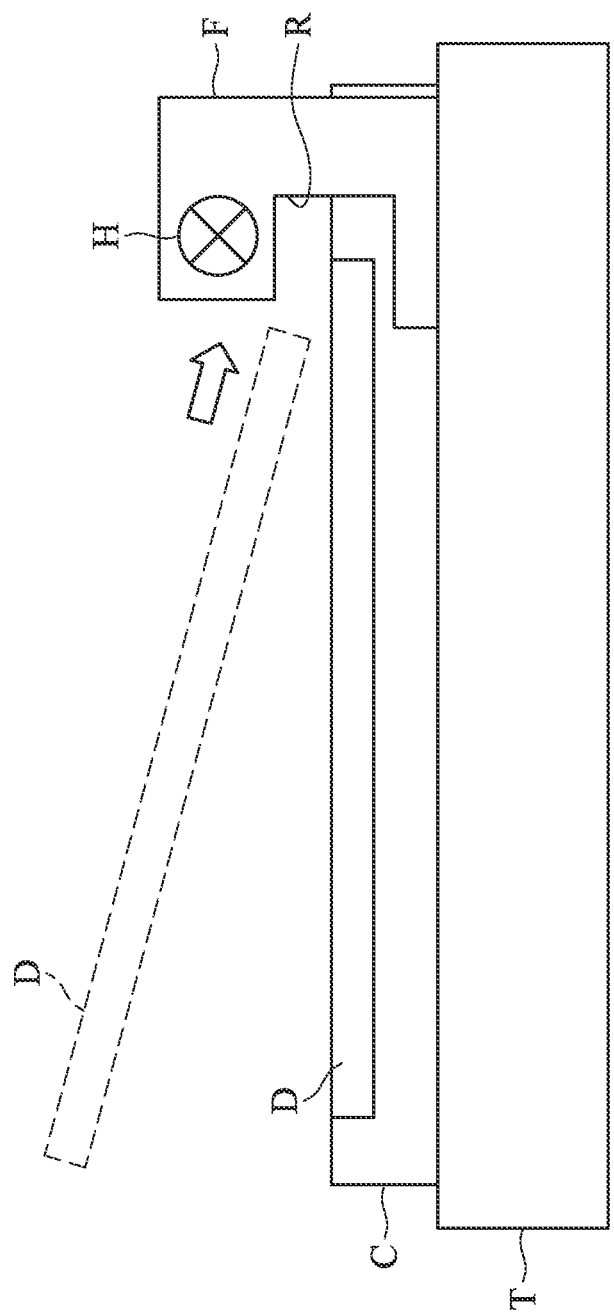
FIG. 2 is a schematic diagram showing a display panel D of the display module when assembled to the housing C.
Figure 3:
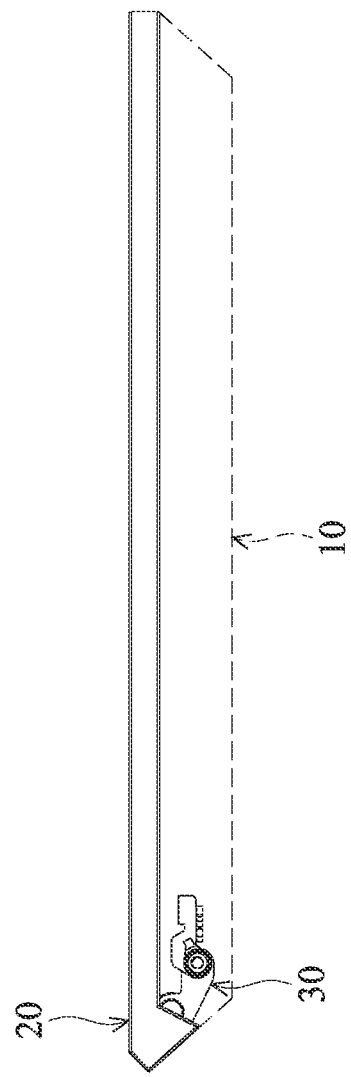
FIG. 3 is a schematic diagram of an electronic device 100 when in a closed state, in accordance with an embodiment of the invention.
Figure 4:
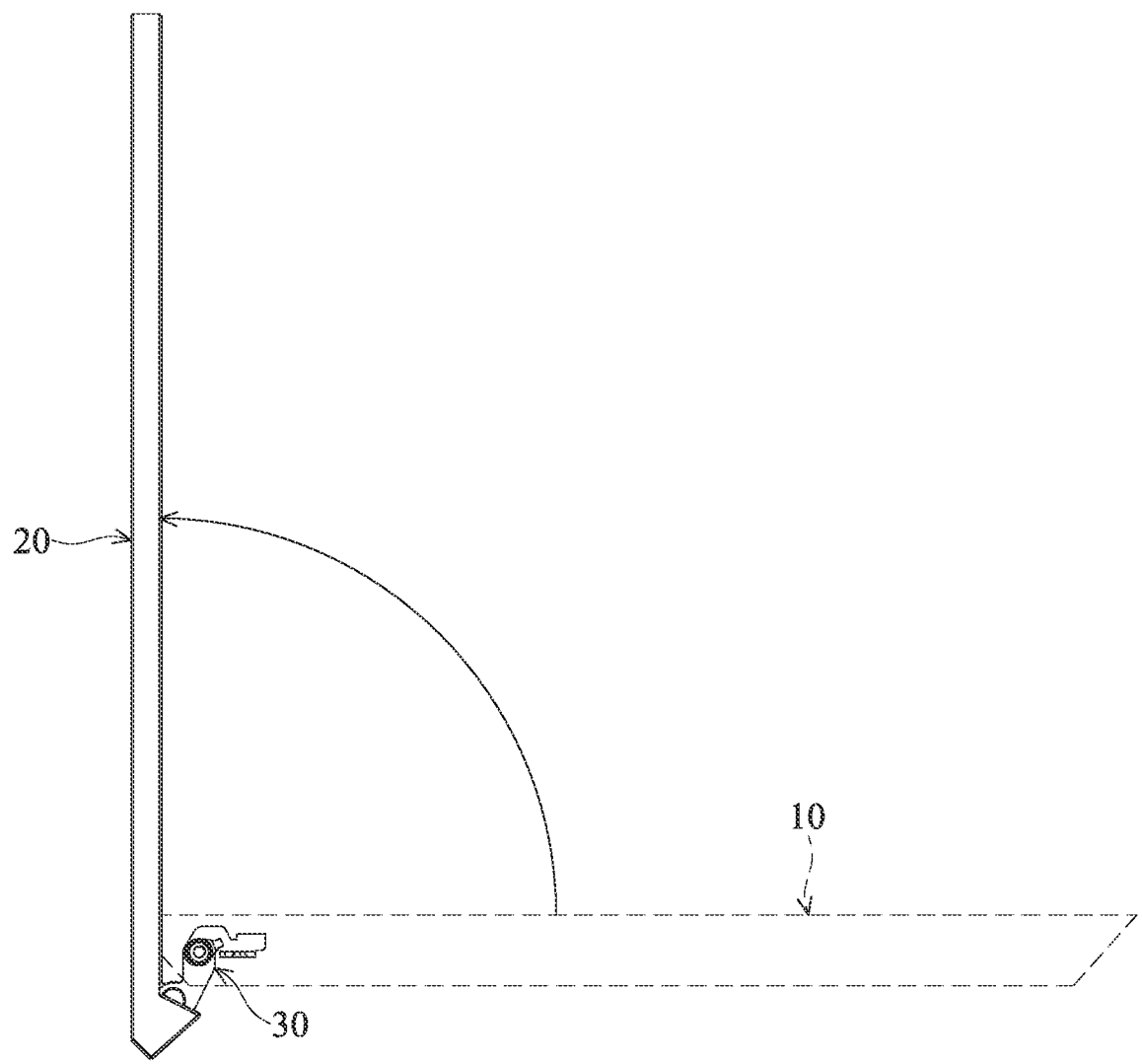
FIG. 4 is a schematic diagram of the electronic device 100 of FIG. 1 when in an unfolded state.
Figure 5:
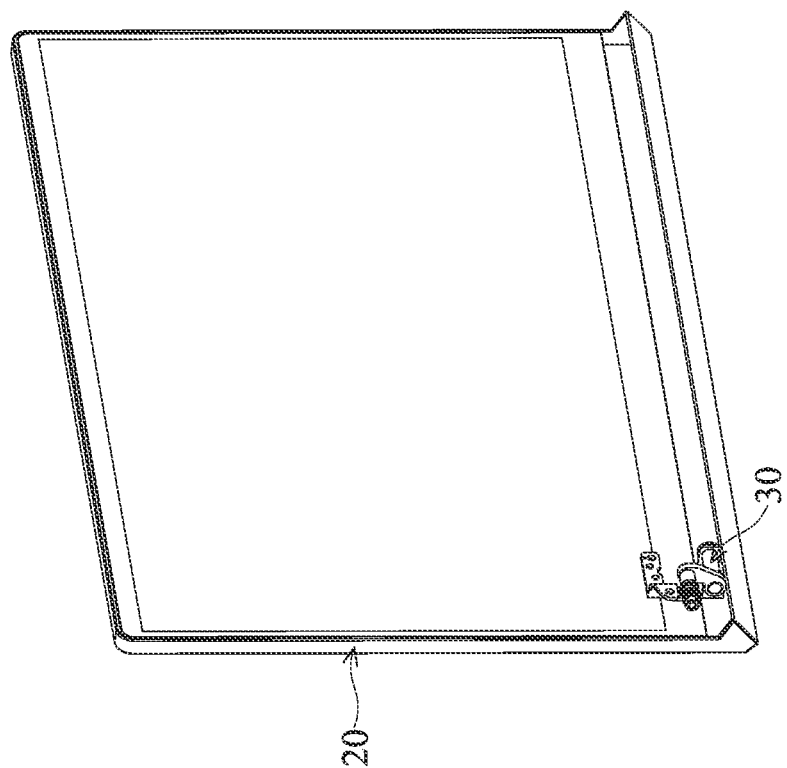
FIG. 5 is a perspective diagram showing the display module 20 and the hinge mechanism 30 after assembly.
Figure 6:
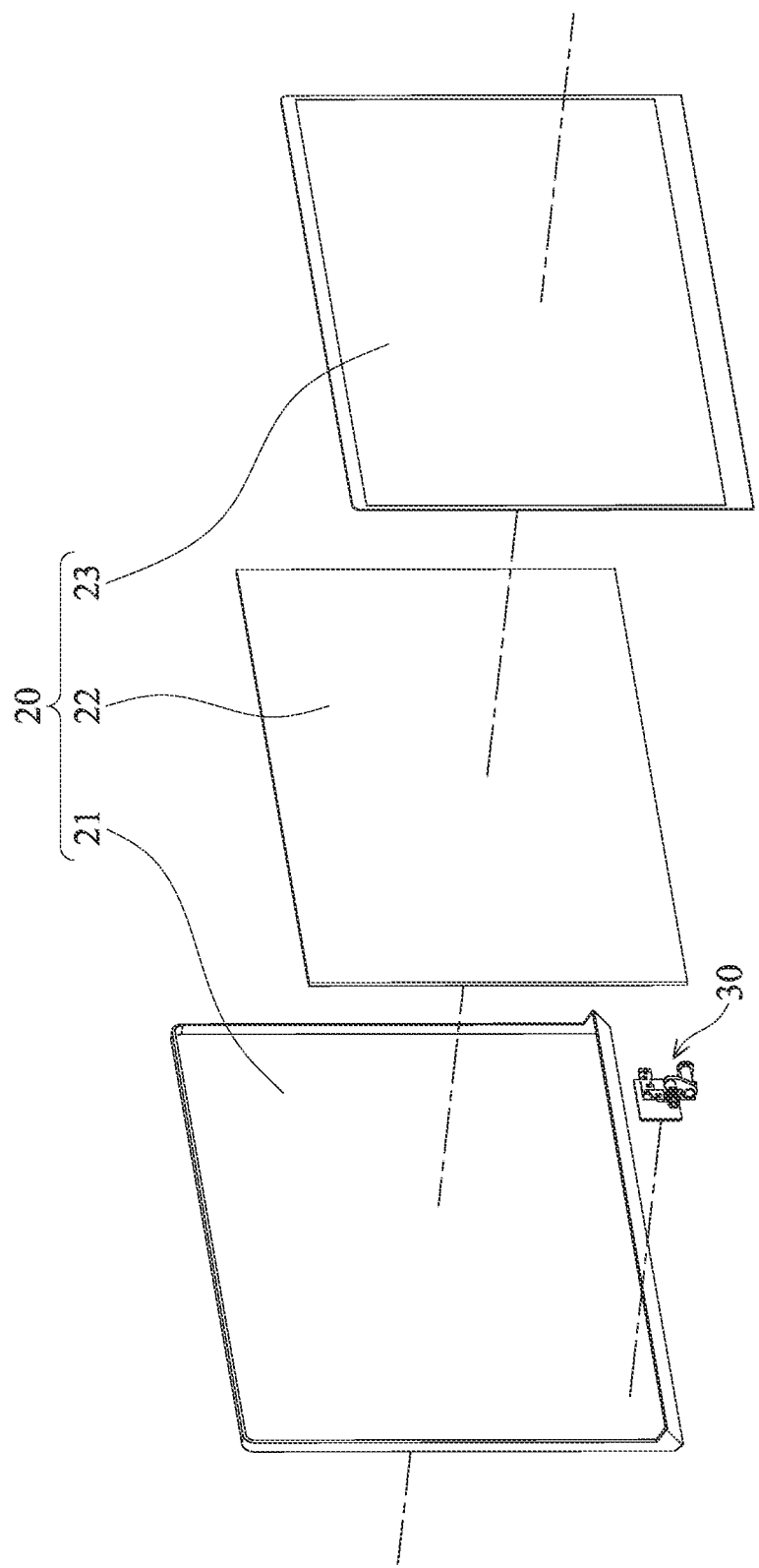
FIG. 6 is an exploded diagram of the display module 20 and the hinge mechanism 30 before assembly.

FIG. 3 is a schematic diagram of an electronic device 100 when in a closed state, in accordance with an embodiment of the invention. FIG. 4 is a schematic diagram of the electronic device 100 of FIG. 1 when in an unfolded state. FIG. 5 is a perspective diagram showing the display module 20 and the hinge mechanism 30 after assembly. FIG. 6 is an exploded diagram of the display module 20 and the hinge mechanism 30 before assembly.

Referring to FIGS. 3-6, an embodiment of an electronic device 100 may be a laptop computer that primarily comprises a main body 10 and a display module 20 pivotally connected to each other via a hinge mechanism 30.

In some embodiments, a keyboard (e.g. QWERTY keyboard) and/or a touch pad may be provided on the surface of the main body 10. It should be noted that the keyboard and/or the touch pad can be used as a user input interface, whereby the user can easily use the electronic device 100. When the display module 20 is unfolded relative to the main body 10 (FIG. 4), the user can watch the screen on the display module 20, and he or she can also input the instructions or control the mouse cursor on the screen of the display module 20 via the keyboard or touchpad.

As shown in FIG. 6, the display module 20 comprises a hollow housing 21, a display panel 22, and a cover 23. The display panel 22 is disposed in the housing 21, and the cover 23 is mounted on the housing 21 to protect and restrict the display panel 22 in the housing 21. The user can watch the image generated by the display panel 22 via a transparent window of the cover 23.

For example, the display panel 22 may be an LCD or OLED panel. During assembly, a part of the hinge mechanism 30 can be disposed in the housing 21 first, and the display panel 22 is then assembled to the housing 21 without mechanical interference of the hinge mechanism 30. Subsequently, the cover 23 can be mounted on the housing 21 to restrict the display panel 22 at the center of the housing 21.

Figure 7:
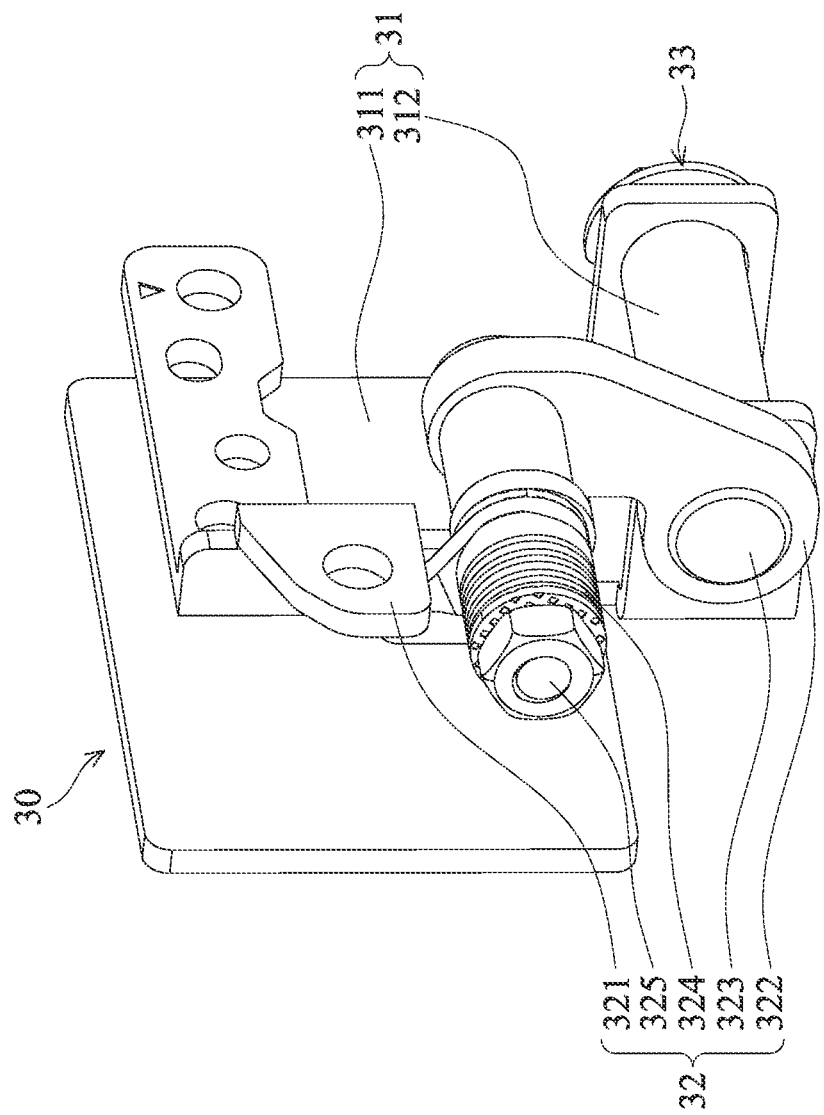
FIG. 7 is a perspective diagram of the hinge mechanism 30 in FIGS. 3-6.
Figure 8:
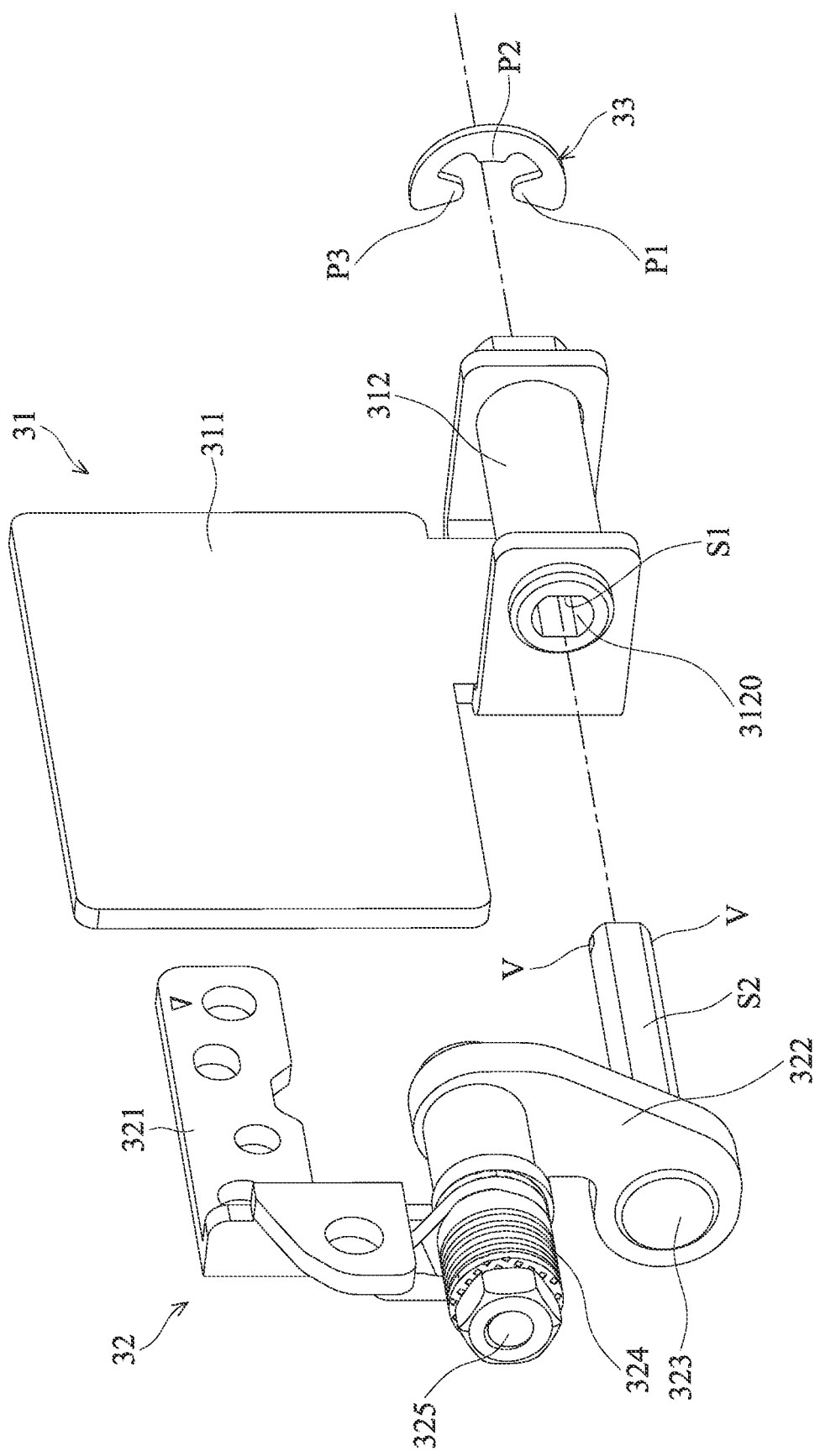
FIG. 8 is an exploded diagram of the hinge mechanism 30 of FIG. 7.
Figure 9:
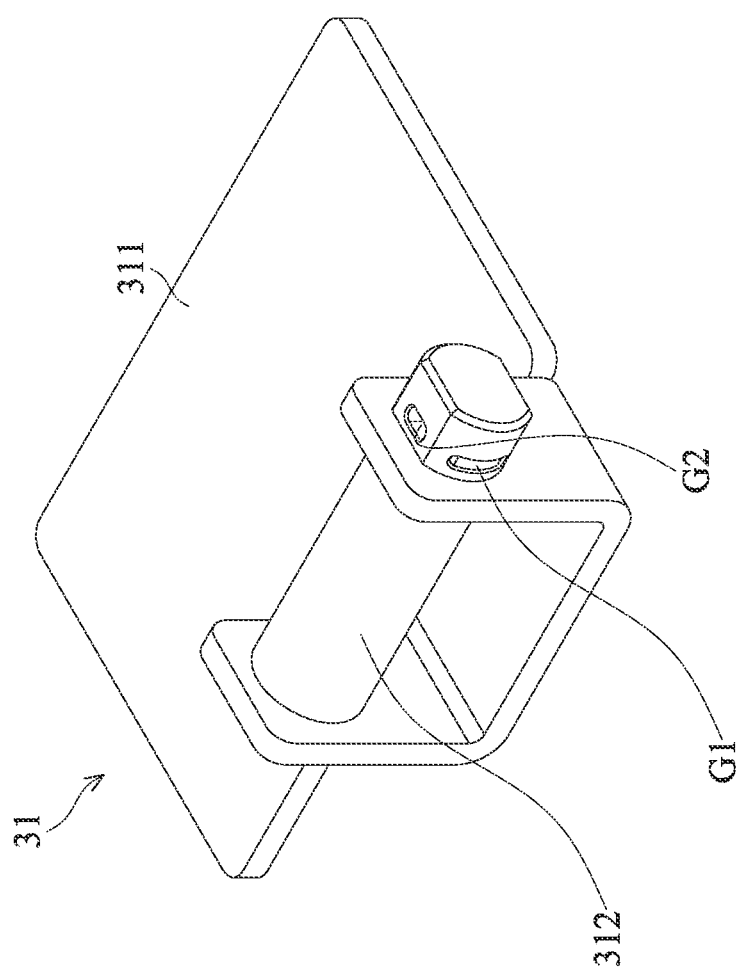
FIG. 9 is a perspective diagram of the connecting unit 31 in FIGS. 7 and 8.
Figure 10:
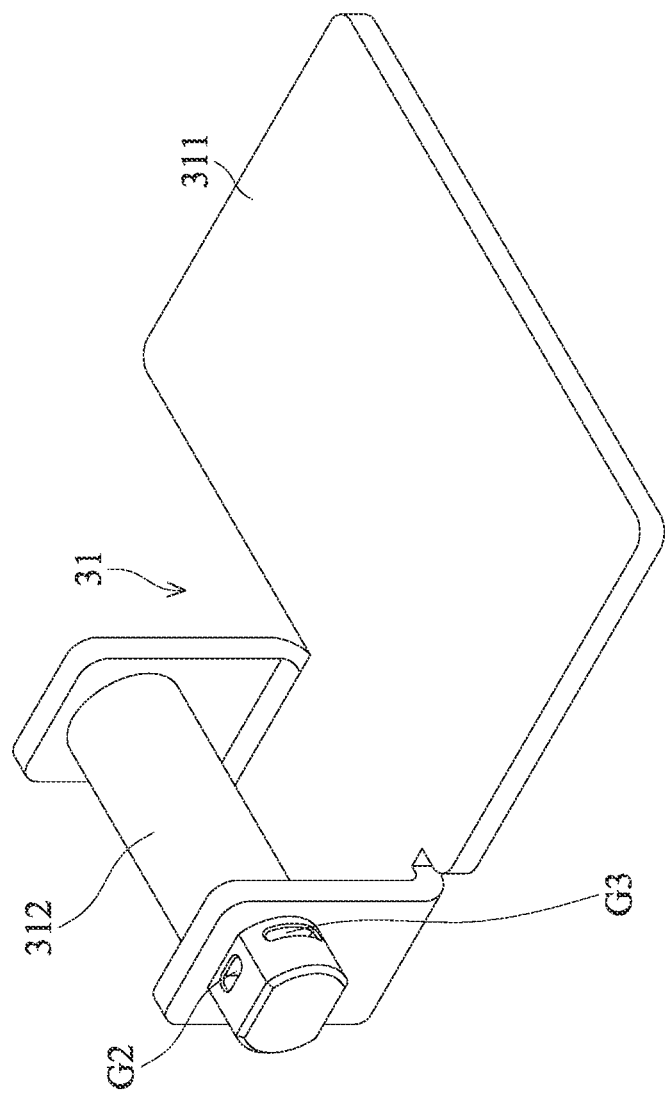
FIG. 10 is another perspective diagram of the connecting unit 31 in FIGS. 7 and 8.
Figure 11:
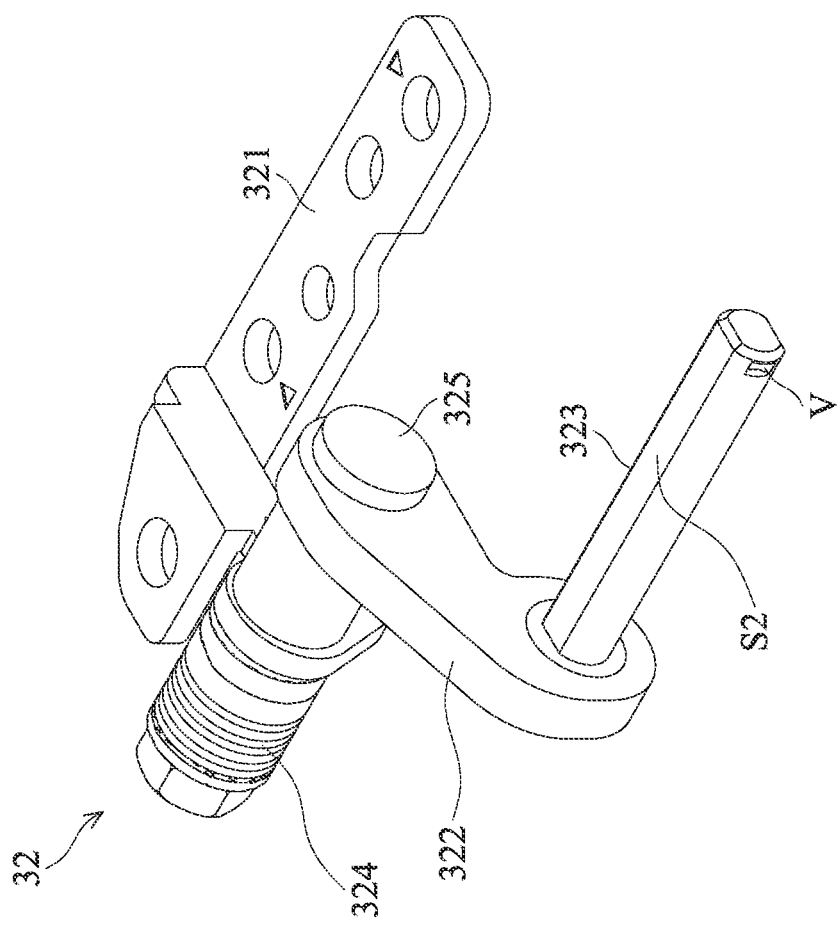
FIG. 11 is a perspective diagram of the hinge unit 32 in FIGS. 7 and 8.
Figure 12:
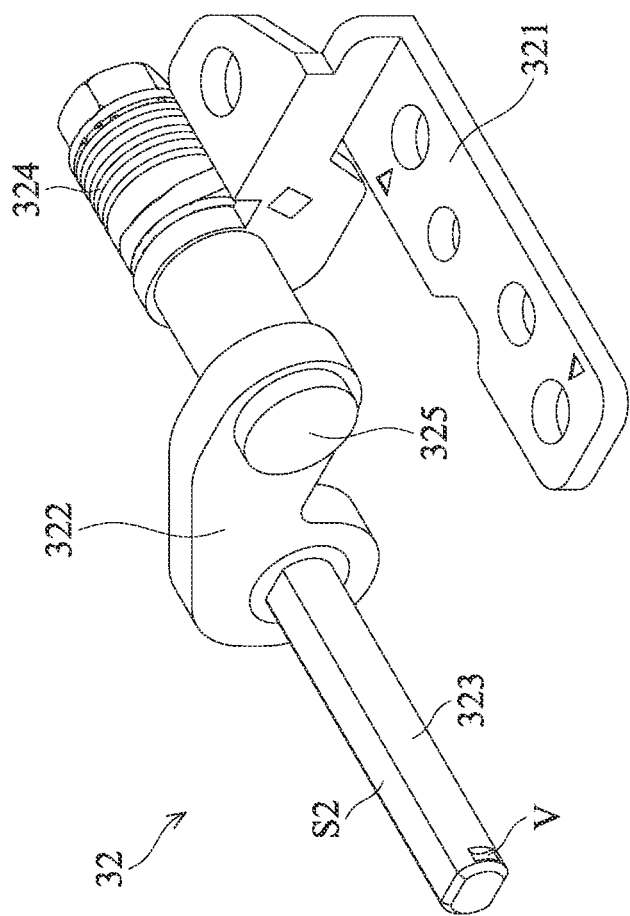
FIG. 12 is another perspective diagram of the hinge unit 32 in FIGS. 7 and 8.
Figure 13:
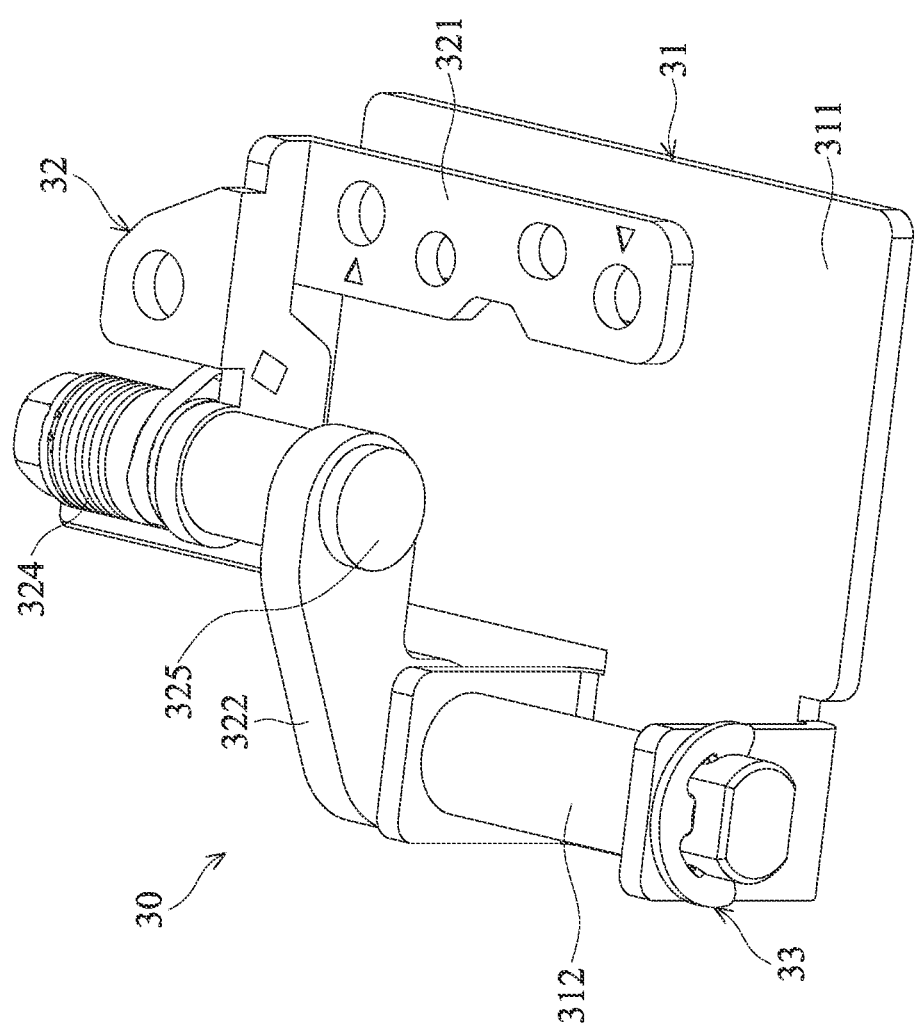
FIG. 13 is another perspective diagram of the hinge mechanism 30.

FIG. 7 is a perspective diagram of the hinge mechanism 30 in FIGS. 3-6. FIG. 8 is an exploded diagram of the hinge mechanism 30 of FIG. 7. FIG. 9 is a perspective diagram of the connecting unit 31 in FIGS. 7 and 8. FIG. 10 is another perspective diagram of the connecting unit 31 in FIGS. 7 and 8. FIG. 11 is a perspective diagram of the hinge unit 32 in FIGS. 7 and 8. FIG. 12 is another perspective diagram of the hinge unit 32 in FIGS. 7 and 8. FIG. 13 is another perspective diagram of the hinge mechanism 30.

Referring to FIGS. 7-13, the hinge mechanism 30 primarily comprises a connecting unit 31, a hinge unit 32, and a locking element 33. In this embodiment, the locking element 33 has a C-shaped structure. The connecting unit 31 has a connecting member 311 and a tubular member 312 affixed to the connecting member 311. The hinge unit 32 has a first member 321, a second member 322, a rod 323, a frictional assembly 324, and a shaft 325.

It should be noted that the first and second members 321 and 322 are hinged to each other via the shaft 325. The shaft 325 extends through the frictional assembly 324 and the first and second members 321 and 322, and the frictional assembly 324 is clamped between a nut at the end of the shaft 325 and the first and second members 321 and 322. When the second member 322 rotates relative to the first member 321, the frictional assembly 324 can provide appropriate resistance torque to enhance the stability of the hinge mechanism 30.

The rod 323 is affixed to the second member 322. During assembly, the rod 323 can be inserted into a chamber 3120 of the tubular member 312 (FIG. 8), and three protrusions P1, P2, and P3 of the locking element 33 can be fastened through the holes G1, G2, and G3 of the tubular member 312 (FIGS. 9 and 10) and engaged in the slots V of the rod 323 (FIG. 11). Thus, the rod 323 can be firmly restricted and affixed in the tubular member 312.

Moreover, as shown in FIG. 8, a first flat surface S1 is formed on the inner side of the tubular member 312, and a second flat surface S2 is formed on the outer side of the rod 323. When the rod 323 is inserted into the chamber 3120 of the tubular member 312, the second flat surface S2 abuts the first flat surface S1, thereby preventing rotation of the rod 323 relative to the tubular member 312.

In some embodiments, the shaft 325, the rod 323, the connecting member 311, the tubular member 312, the locking element 33, and the first and second members 321 and 322 have metal or plastic material. Here, the first member 321 is secured to the main body 10 of the electronic device 100 by screws, and the connecting member 311 of the connecting unit 31 is affixed to the housing 21 of the display module 20. As shown in FIG. 4, when the display module 20 is unfolded with respect to the main body 10 of the electronic device 100, the connecting unit 31 and the second member 322 are rotated along with the display module 20 relative to the main body 10 and the first member 321, so that the user can watch the screen on the display module 20.

Figure 14:
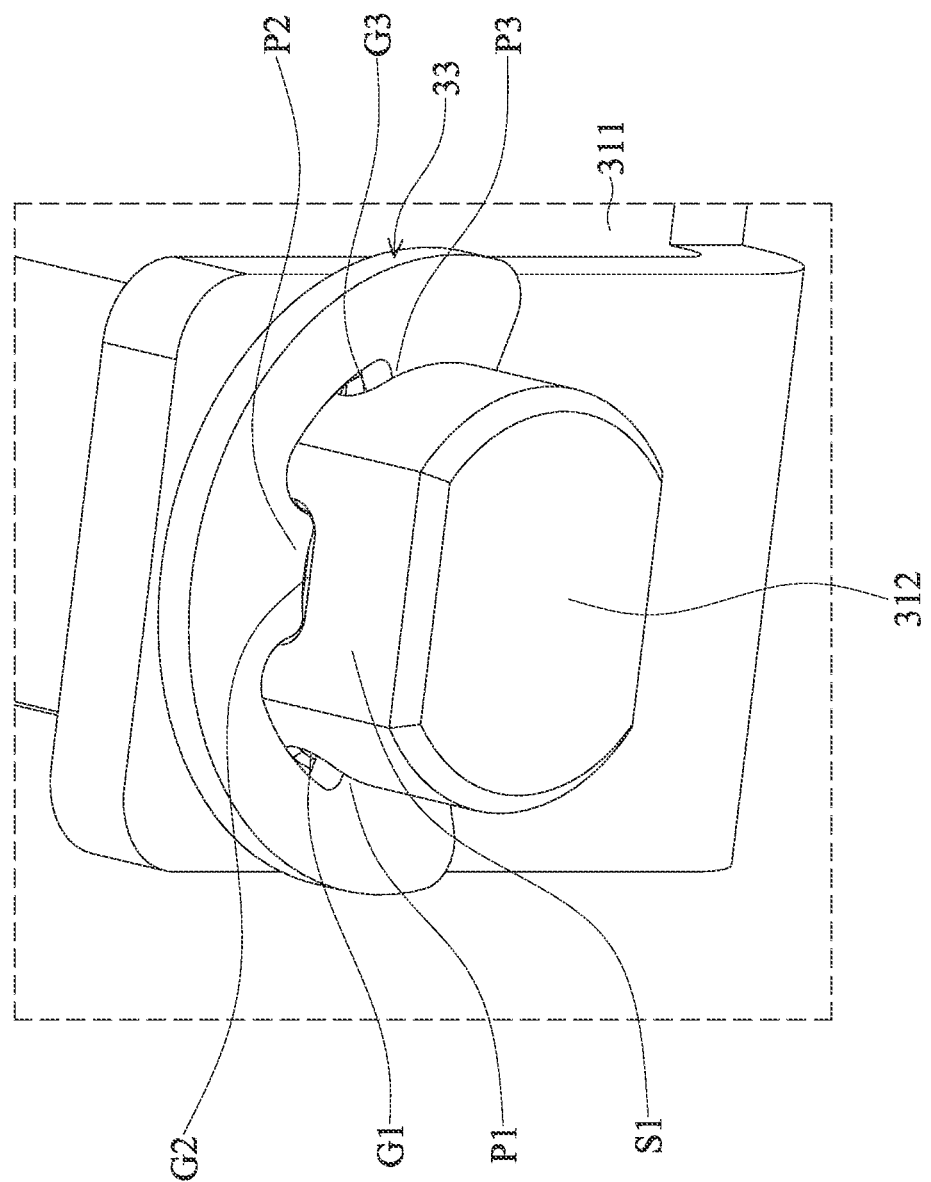
FIG. 14 is a perspective diagram showing three protrusions P1, P2, and P3 of the locking element 33 fastened through the holes G1, G2, and G3 of the tubular member 312.
Figure 15:
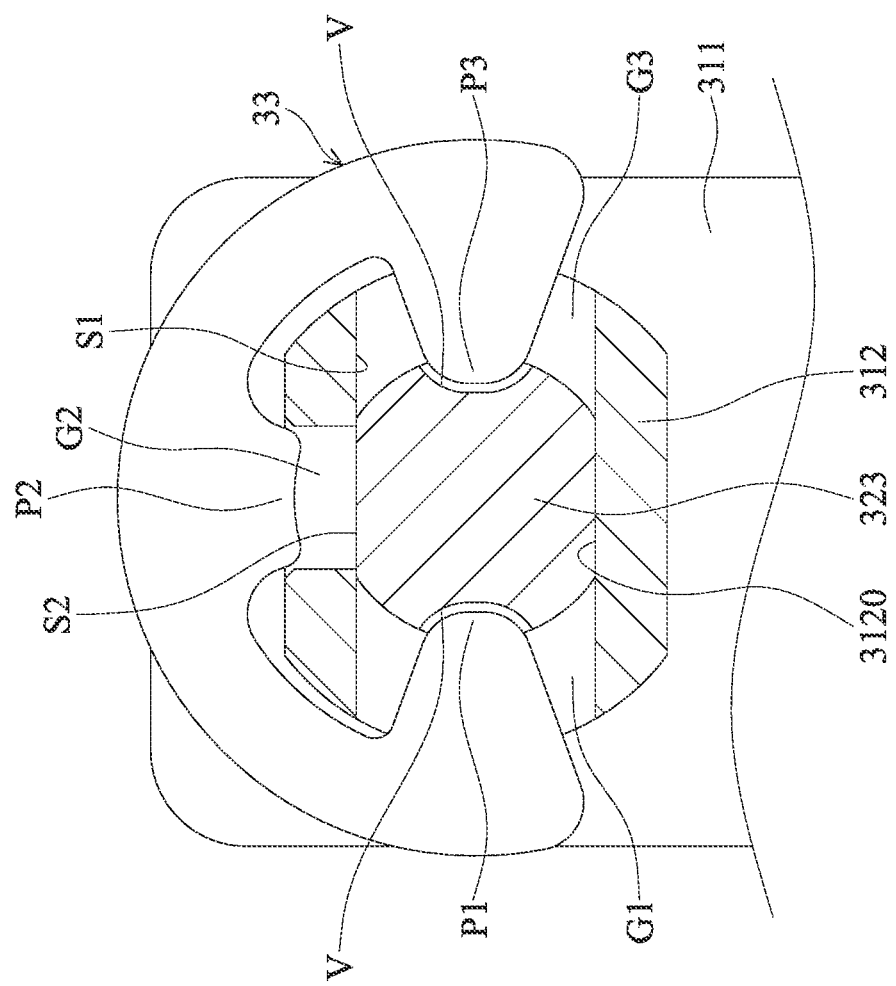
FIG. 15 is a cross-sectional view showing the protrusions P1 and P3 of the locking element 33 fastened through the holes G1 and G3 of the tubular member 312 and engaged in the slots V of the rod 323.

FIG. 14 is a perspective diagram showing three protrusions P1, P2, and P3 of the locking element 33 fastened through the holes G1, G2, and G3 of the tubular member 312. FIG. 15 is a cross-sectional view showing the protrusions P1 and P3 of the locking element 33 fastened through the holes G1 and G3 of the tubular member 312 and engaged in the slots V of the rod 323.

Referring to FIGS. 14 and 15, the holes G1, G2, and G3 are located close to an end of the tubular member 312, and the protrusions P1, P2, and P3 extend toward the interior of the C-shaped locking element 33. When the rod 323 is joined in the chamber 3120 of the tubular member 312, the C-shaped locking element 33 are assembled to the end of the tubular member 312, wherein the protrusions P1, P2, and P3 of the locking element 33 are fastened through the holes G1, G2, and G3, and the two protrusions P1 and P3 on opposite sides of the locking element 33 are further engaged in the slots V of the rod 323. Therefore, the rod 323 can be firmly restricted and affixed in the tubular member 312.

Figure 16:
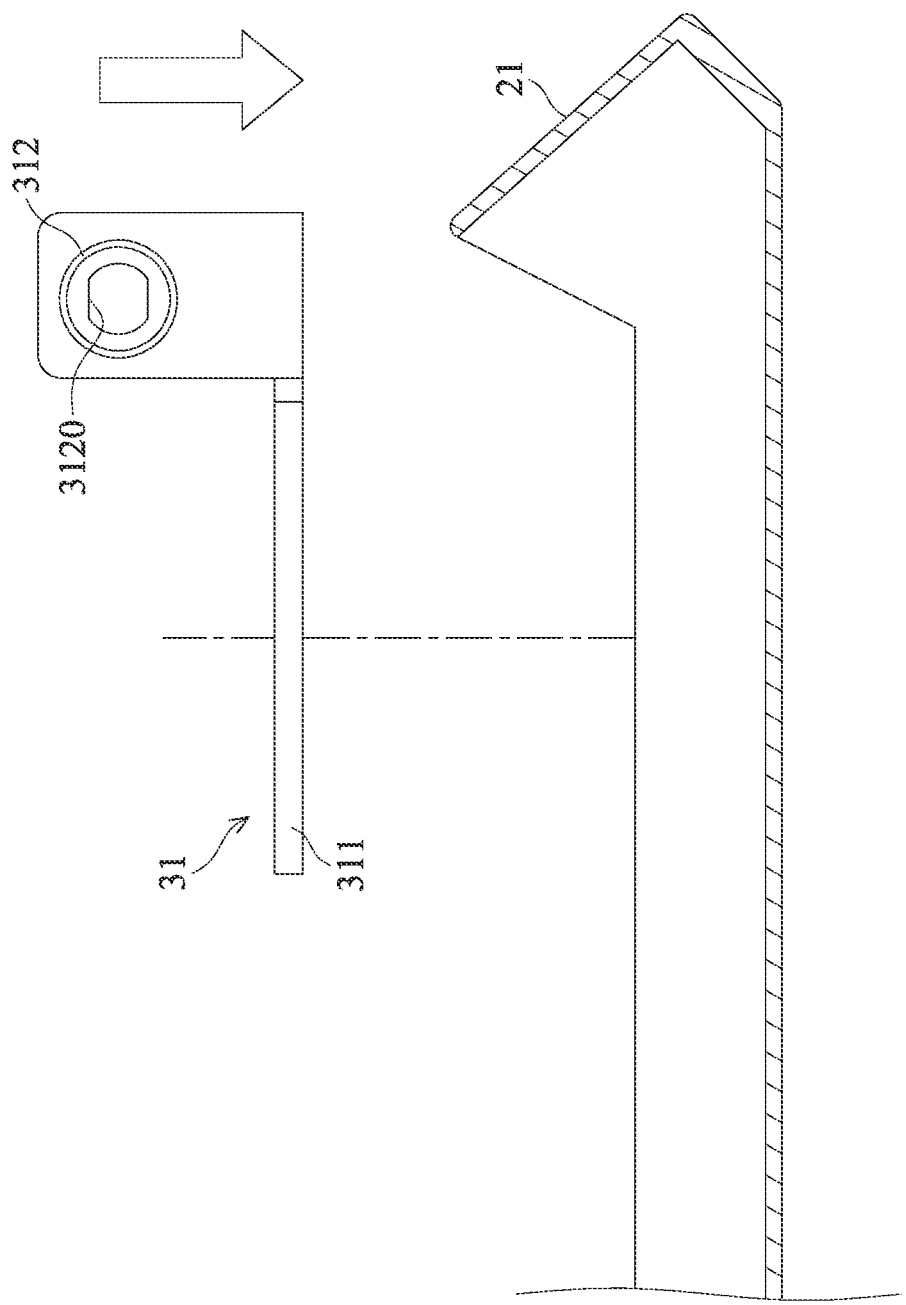
FIG. 16 is a schematic diagram showing the connecting unit 31 and the housing 21 before assembly.
Figure 17:
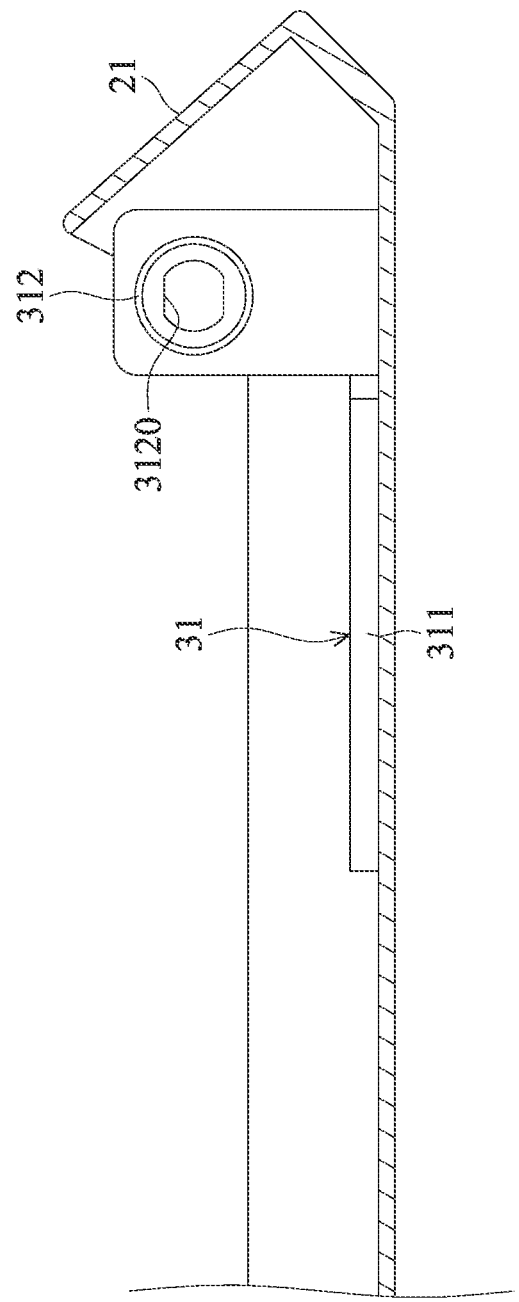
FIG. 17 is a schematic diagram showing the connecting member 311 of the connecting unit 31 when mounted to the inner surface of the housing 21.
Figure 18:
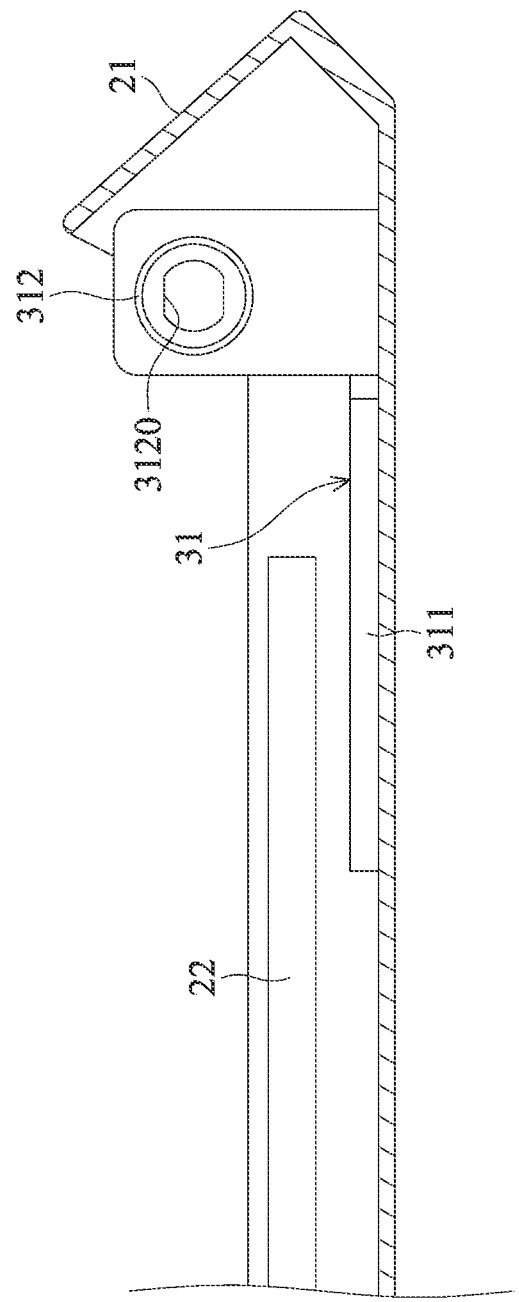
FIG. 18 is a schematic diagram showing the display panel 22 when disposed in the housing 21.
Figure 19:
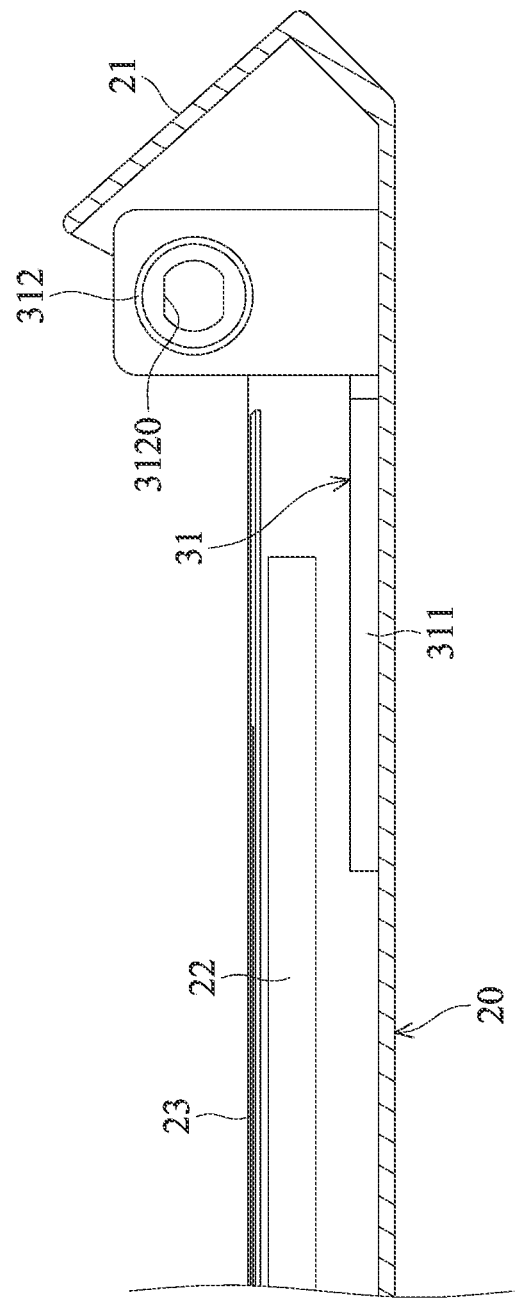
FIG. 19 is a schematic diagram showing the cover 23 is assembled to the housing 21 for covering the display panel 22.
Figure 20:
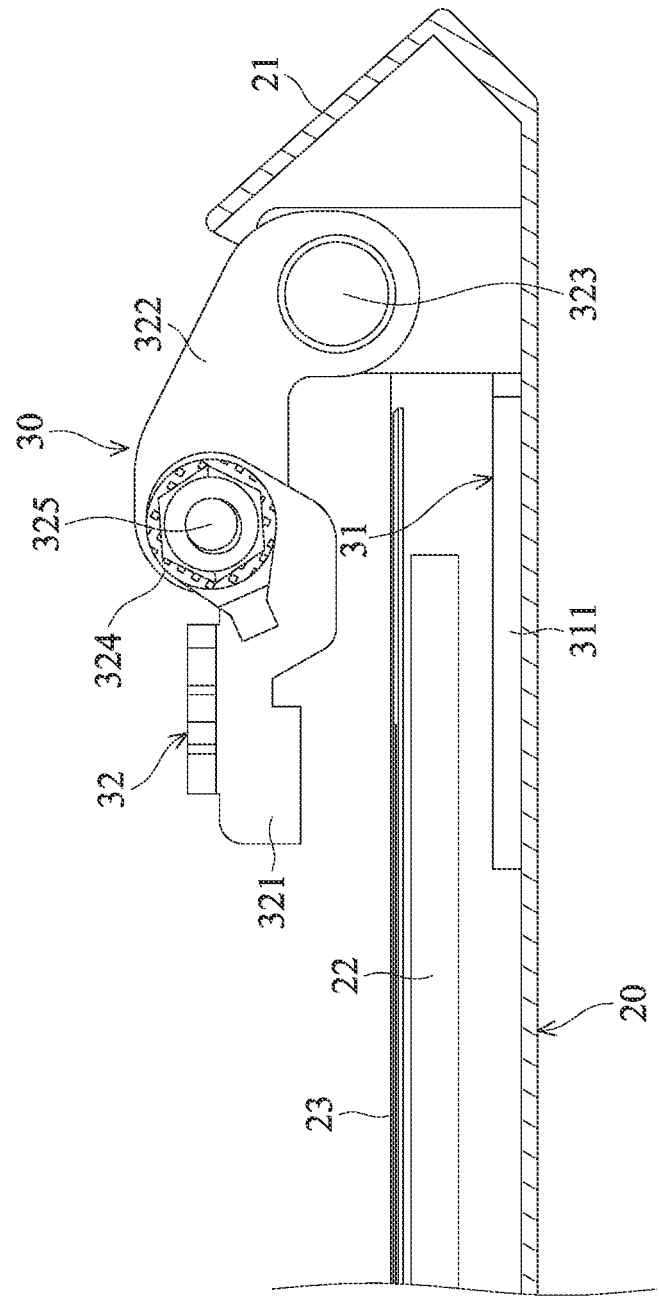
FIG. 20 is a schematic diagram showing the hinge unit 32 and the locking element 33 are assembled to the connecting unit 31 to form the hinge mechanism 30.

FIG. 16 is a schematic diagram showing the connecting unit 31 and the housing 21 before assembly. FIG. 17 is a schematic diagram showing the connecting member 311 of the connecting unit 31 when mounted to the inner surface of the housing 21. FIG. 18 is a schematic diagram showing the display panel 22 when disposed in the housing 21. FIG. 19 is a schematic diagram showing the cover 23 is assembled to the housing 21 for covering the display panel 22. FIG. 20 is a schematic diagram showing the hinge unit 32 and the locking element 33 are assembled to the connecting unit 31 to form the hinge mechanism 30.

Referring to FIGS. 16-20, the hinge mechanism 30 comprise three parts of the connecting unit 31, the hinge unit 32, and the locking element 33, and only the connecting unit 31 of the hinge mechanism 30 is assembled to the housing 21 before placing the display panel 22 into the housing 21. Therefore, mechanical interference between the hinge mechanism 30 and the display panel 22 can be efficiently avoided. In this embodiment, firstly, the connecting unit 31 is disposed in the housing 21, as indicated by the arrow in FIG. 16, and the connecting member 311 of the connecting unit 31 may be affixed to the inner surface of the housing 21 by adhesive or screws (FIG. 17).

Subsequently, the display panel 22 can be placed into the housing 21 (FIG. 18). In this state, since the hinge unit 32 has not been joined with the connecting unit 31, the hinge mechanism 30 would not influence the display panel 22 when assembled to the housing 21, thereby improving manufacturing efficiency of the electronic device 100. Next, the cover 23 can be mounted to the housing 21 for covering the display panel 22, thus accomplish the assembly process of the display module 20 (FIG. 19).

After the aforementioned steps, the rod 323 of the hinge unit 32 can be inserted into the tubular member 312, and the protrusions P1, P2, and P3 of the C-shaped locking element 33 can be fastened through the holes G1, G2, and G3 with the protrusions P1 and P3 engaged in the slots V of the rod 323. Therefore, the connecting unit 31 can be firmly joined with the hinge unit 32 to form the hinge mechanism 30 (FIG. 20). At last, the first member 321 of the hinge unit 32 can be mounted to the main body 10 by screws to accomplish the assembly of the electronic device 100 (FIGS. 3 and 4).

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A hinge mechanism, comprising:
   a connecting unit, having a connecting member and a tubular member disposed on the connecting member;
   a hinge unit, having a first member, a second member, a shaft pivotally connecting the first member to the second member, and a rod affixed to the second member, wherein the rod extends into the tubular member and has a slot; and
   a locking element, fastened through the tubular member and joined in the slot;
   wherein a first flat surface is formed on an inner side of the tubular member, a second flat surface is formed on an outer side of the rod, and the second flat surface abuts the first flat surface when the rod is received in the tubular member.

2. The hinge mechanism as claimed in claim 1, wherein the locking element has a C-shaped structure.

3. The hinge mechanism as claimed in claim 2, wherein the locking element forms a protrusion extending through the tubular member and joined in the slot.

4. The hinge mechanism as claimed in claim 3, wherein the protrusion extends toward the interior of the locking element.

5. The hinge mechanism as claimed in claim 4, wherein the locking element has a hole located close to an end of the locking element, and the protrusion extends through the hole and is joined in the slot.

6. The hinge mechanism as claimed in claim 2, wherein the locking element forms a plurality of protrusions, and the rod has a plurality of slots, wherein the protrusions extend through the tubular member and are joined in the slots.

7. The hinge mechanism as claimed in claim 6, wherein the protrusions are located on opposite sides of the locking element.

8. An electronic device, comprising:
a main body;
a display module; and
the hinge mechanism as claimed in claim 1, wherein the first member is affixed to the main body, and the connecting member is affixed to the display module.

9. The electronic device as claimed in claim 8, wherein the display module has a housing, a display panel disposed in the housing, and a cover connected to the housing for covering the display panel, and the connecting member is affixed to the housing.

* * * * *